(12) United States Patent
Zhang et al.

(10) Patent No.: US 8,265,642 B2
(45) Date of Patent: Sep. 11, 2012

(54) SYSTEMS, APPARATUS AND METHODS FOR PHYSICAL RANDOM ACCESS CHANNEL PROCESSING

(75) Inventors: Xiaoxia Zhang, San Diego, CA (US); Durga Prasad Malladi, San Diego, CA (US); Yongbin Wei, San Diego, CA (US); Hao Xu, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 12/816,305

(22) Filed: Jun. 15, 2010

(65) Prior Publication Data

US 2011/0143762 A1 Jun. 16, 2011

Related U.S. Application Data

(60) Provisional application No. 61/187,572, filed on Jun. 16, 2009.

(51) Int. Cl.
*H04W 72/00* (2009.01)
(52) U.S. Cl. .......................... 455/450; 370/329; 370/341
(58) Field of Classification Search ........................ None
See application file for complete search history.

(56) References Cited

U.S. PATENT DOCUMENTS

| 7,697,594 | B2* | 4/2010 | Flaig et al. | .................. 375/148 |
| 2010/0041428 | A1* | 2/2010 | Chen et al. | .................. 455/522 |
| 2010/0254335 | A1* | 10/2010 | Koo et al. | .................. 370/329 |
| 2011/0090863 | A1* | 4/2011 | Hao et al. | .................. 370/330 |
| 2011/0164523 | A1* | 7/2011 | Catreux-Erceg et al. | ..... 370/252 |

FOREIGN PATENT DOCUMENTS

| WO | WO2008156321 | 12/2008 |
| WO | WO2009005417 | 1/2009 |

OTHER PUBLICATIONS

International Search Report and Written Opinion—PCT/US2010/038888, International Search Authority—European Patent Office—Nov. 19, 2010.
Romain Masson: "E-Utra Rach within the LTE system" Thesis, Div. Information Theory, DPT Electrical Engineering, Linkoping University, Sweden, Feb. 3, 2006, pp. 1-82, XP002448009 the whole document.

* cited by examiner

*Primary Examiner* — Ajit Patel
(74) *Attorney, Agent, or Firm* — Kenneth Vu

(57) ABSTRACT

Systems and methods for processing a physical random access channel are provided. In some embodiments, a method can include: receiving a signal indicative of a strong user and a desired user on a physical random access channel; performing at least one of a single segment frequency domain detection or a multi-segment frequency domain detection on the signal indicative of a strong user and a desired user; generating a residual signal by cancelling out the signal indicative of a strong user; and obtaining a message transmitted by a user equipment by performing at least one of the single segment frequency domain detection or multi-segment frequency domain detection on the residual signal.

48 Claims, 12 Drawing Sheets

SYSTEMS, APPARATUS AND METHODS FOR PHYSICAL RANDOM ACCESS CHANNEL PROCESSING

CROSS-REFERENCE TO RELATED APPLICATIONS

This application claims the benefit of U.S. Provisional Patent Application Ser. No. 61/187,572, filed Jun. 16, 2009, which is titled "Random Access Channel Transmissions to Minimize Interference," and the entire contents of which are incorporated herein by reference.

BACKGROUND

I. Field

The following description relates to wireless communications, in general, and to systems, methods and apparatus for facilitating physical random access channel (PRACH) processing in wireless communication systems, in particular.

II. Background

Wireless communication systems are widely deployed to provide various types of communication. For instance, voice and/or data can be provided via such wireless communication systems. A typical wireless communication system, or network, can provide multiple users access to one or more shared resources (e.g., bandwidth, transmit power). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple access communication systems can simultaneously support communication for multiple user equipment (UEs). Each UE can communicate with one or more base stations (BSs) via transmissions on forward and reverse links. The forward link (or downlink (DL)) refers to the communication link from BSs to UEs, and the reverse link (or uplink (UL)) refers to the communication link from UEs to BSs.

Notwithstanding the foregoing, inter-cell interference is a substantial problem in wireless communication systems. In Long-Term Evolution (LTE) Release 8 wireless communication systems, the physical random access channel (PRACH), which is transmitted on the UL, uses a Chu sequence, which has good correlation properties and zero correlation zone within the same root, to minimize inter-cell interference. In particular, neighboring cells can use different root sequences to minimize inter-cell interference. Systems, apparatus and methods for facilitating PRACH processing in wireless communication systems are therefore desirable.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating PRACH processing in wireless communication systems.

In one aspect, a method is provided. The method can include: receiving a signal indicative of a strong user and a desired user on a physical random access channel; performing at least one of a single segment frequency domain detection or a multi-segment frequency domain detection on the signal indicative of a strong user and a desired user; generating a residual signal by cancelling out the signal indicative of a strong user; and obtaining a message transmitted by a user equipment by performing at least one of the single segment frequency domain detection or multi-segment frequency domain detection on the residual signal.

In another aspect, a computer program product having a computer-readable medium is provided. The computer program product can include: a first set of codes for causing a computer to receive a signal indicative of a strong user and a desired user on a physical random access channel; a second set of codes for causing the computer to perform at least one of a single segment frequency domain detection or a multi-segment frequency domain detection on the signal indicative of a strong user and a desired user; a third set of codes for causing the computer to generate a residual signal by cancelling out the signal indicative of a strong user; and a fourth set of codes for causing the computer to obtain a message transmitted by a user equipment by performing at least one of the single segment frequency domain detection or multi-segment frequency domain detection on the residual signal.

In another aspect, an apparatus is provided. The apparatus can include: means for receiving a signal indicative of a strong user and a desired user on a physical random access channel; means for performing at least one of a single segment frequency domain detection or a multi-segment frequency domain detection on the signal indicative of a strong user and a desired user; means for generating a residual signal by cancelling out the signal indicative of a strong user; and means for obtaining a message transmitted by a user equipment by performing at least one of the single segment frequency domain detection or multi-segment frequency domain detection on the residual signal.

In another aspect, another apparatus is provided. The apparatus can include: a physical random access channel processing module configured to: receive a signal indicative of a strong user and a desired user on a physical random access channel; perform at least one of a single segment frequency domain detection or a multi-segment frequency domain detection on the signal indicative of a strong user and a desired user; generate a residual signal by cancelling out the signal indicative of a strong user; and obtain a message transmitted by a user equipment by performing at least one of the single segment frequency domain detection or multi-segment frequency domain detection on the residual signal.

In yet another aspect, another method is provided. The method can include transmitting a message to a first base station, wherein the message is included in a first signal received at the first base station and having strong interference from a second signal, and wherein the message is a random access message transmitted on a physical random access channel.

In still another aspect, another computer program product having a computer readable medium is provided. The computer program product can include a first set of codes for causing a computer to transmit a message to a first base station, wherein the message is included in a first signal received at the first base station and having strong interference from a second signal, and wherein the message is a random access message transmitted on a physical random access channel.

In yet another aspect, another apparatus is provided. The apparatus can include means for transmitting a message to a first base station, wherein the message is included in a first signal received at the first base station and having strong interference from a second signal, and wherein the message is a random access message transmitted on a physical random access channel.

In still another aspect, another apparatus is provided. The apparatus can include: a physical random access channel processing module configured to: transmit a message to a first base station, wherein the message is included in a first signal received at the first base station and having strong interference from a second signal, and wherein the message is a random access message transmitted on a physical random access channel.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
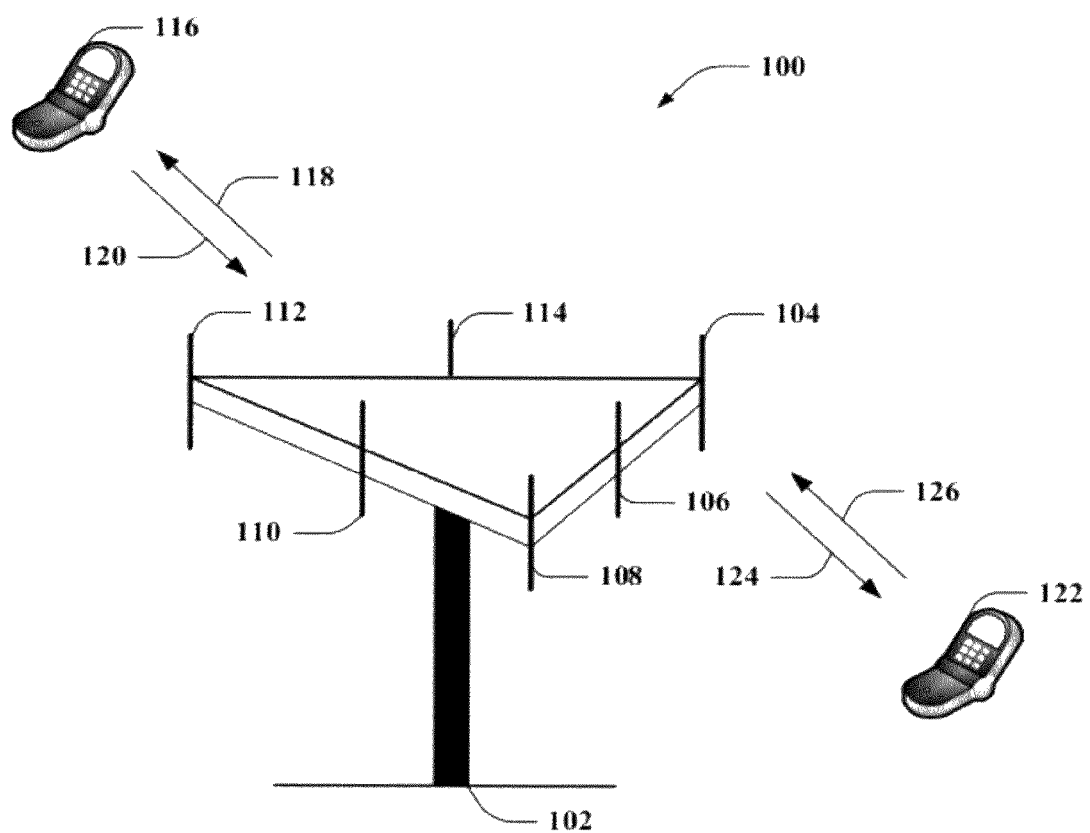
FIG. 1 is an illustration of an example wireless communication system facilitating PRACH processing in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiments may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software and/or software in execution. For example, a component can be, but is not limited to being, a process running on a processor, a processor, an object, an executable, a thread of execution, a program, and/or a computer. By way of illustration, both an application running on a computing device and/or the computing device can be a component. One or more components can reside within a process and/or thread of execution and a component can be localized on one computer and/or distributed between two or more computers. In addition, these components can execute from various computer-readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and/or other systems. The terms "system" and "network" are often used interchangeably. A CDMA system can implement a radio technology such as Universal Terrestrial Radio Access (UTRA), CDMA8020, etc. UTRA includes Wideband-CDMA (W-CDMA) and other variants of CDMA. CDMA8020 covers IS-8020, IS-95 and IS-856 standards. An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA8020 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA can have similar performance and essentially the same overall complexity as those of an OFDMA system. A SC-FDMA signal can have lower peak-to-average power ratio (PAPR) because of its inherent single carrier structure. SC-FDMA can be used, for instance, in uplink communications where lower PAPR greatly benefits UEs in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with UEs. A UE can also be called a system, subscriber unit, subscriber station, mobile station, mobile, remote station, remote terminal, mobile device, access terminal, wireless communication device, user agent or user device. A UE can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a BS or access node (AN). A BS can be utilized for communicating with UEs and can also be referred to as an access point (AP), BS, Femto node, Pico Node, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include, but are not limited to, magnetic storage devices (e.g., hard disk, floppy disk, magnetic strips), optical disks (e.g., compact disk (CD), digital versatile disk (DVD)), smart cards, and flash memory devices (e.g., EPROM, card, stick, key drive). Additionally, various storage media described herein can represent one or more devices and/or other machine-readable media for storing information. The term "machine-readable medium" can include, without being limited to, wireless channels and various other media (and/or storage media) capable of storing, containing, and/or carrying codes and/or instruction(s) and/or data.

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). A UE moves through such a network. The UE may be served in certain locations by BSs that provide macro coverage while the UE may be served at other locations by BSs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a Macro node. A node that provides coverage over a relatively small area (e.g., a residence) may be referred to as a Femto node. A node that provides coverage over an area that is smaller than a macro area and larger than a Femto area may be referred to as a Pico node (e.g., providing coverage within a commercial building).

A cell associated with a Macro node, a Femto node, or a Pico node may be referred to as a macro cell, a Femto cell, or a Pico cell, respectively. In some implementations, each cell may be further associated with (e.g., divided into) one or more sectors.

In various applications, other terminology may be used to reference a Macro node, a Femto node, or a Pico node. For example, a Macro node may be configured or referred to as a BS, AP, eNodeB, macro cell, and so on. Also, a Femto node may be configured or referred to as a Home NodeB, Home eNodeB, AP access node, a BS, a Femto cell, and so on.

FIG. 1 is an illustration of an example wireless communication system facilitating PRACH processing in accordance with various aspects set forth herein. In wireless communication system 100, interference caused by transmissions on the UL can be managed by the BS 102 while interference caused by transmissions on the DL can be managed by the UEs 116, 122.

Referring now to FIG. 1, a wireless communication system 100 is illustrated in accordance with various embodiments presented herein. System 100 includes a BS 102 that can include multiple antenna groups. For example, one antenna group can include antennas 104, 106, another group can comprise antennas 108, 110, and an additional group can include antennas 112, 114. Two antennas are illustrated for each antenna group; however, more or fewer antennas can be utilized for each group. BS 102 can additionally include a transmitting node chain and a receiving node chain, each of which can in turn comprise a plurality of components associated with signal transmission and reception (e.g., processors, modulators, multiplexers, demodulators, demultiplexers, antennas), as will be appreciated by one skilled in the art.

BS 102 can communicate with one or more UEs such as UE 116, 122. However, it is to be appreciated that BS 102 can communicate with substantially any number of UEs similar to UEs 116, 122. UEs 116, 122 can be, for example, cellular phones, smart phones, laptops, handheld communication devices, handheld computing devices, satellite radios, global positioning systems, PDAs, and/or any other suitable device for communicating over wireless communication system 100. As depicted, UE 116 is in communication with antennas 112, 114, where antennas 112, 114 transmit information to UE 116 over DL 118 and receive information from UE 116 over a UL 120. Moreover, UE 122 is in communication with antennas 104, 106, where antennas 104, 106 transmit information to UE 122 over a DL 124 and receive information from UE 122 over a UL 126. In a frequency division duplex (FDD) system, DL 118 can utilize a different frequency band than that used by UL 120, and DL 124 can employ a different frequency band than that employed by UL 126, for example. Further, in a time division duplex (TDD) system, DL 118 and UL 120 can utilize a common frequency band and DL 124 and UL 126 can utilize a common frequency band.

Each group of antennas and/or the area in which they are designated to communicate can be referred to as a sector of BS 102. For example, antenna groups can be designed to communicate to UEs in a sector of the areas covered by BS 102. In communication over DLs 118, 124, the transmitting antennas of BS 102 can utilize beamforming to improve signal-to-noise ratio of DLs 118, 124 for UEs 116, 122. Also, while BS 102 utilizes beamforming to transmit to UEs 116, 122 scattered randomly through an associated coverage, UEs 116, 122 in neighboring cells can be subject to less interference as compared to a BS transmitting through a single antenna to all its UEs. Further, the BS 102 and UEs 116, 122 can be configured providing configuration of scheduling policy for facilitating distributed scheduling as described herein.

Figure 2:
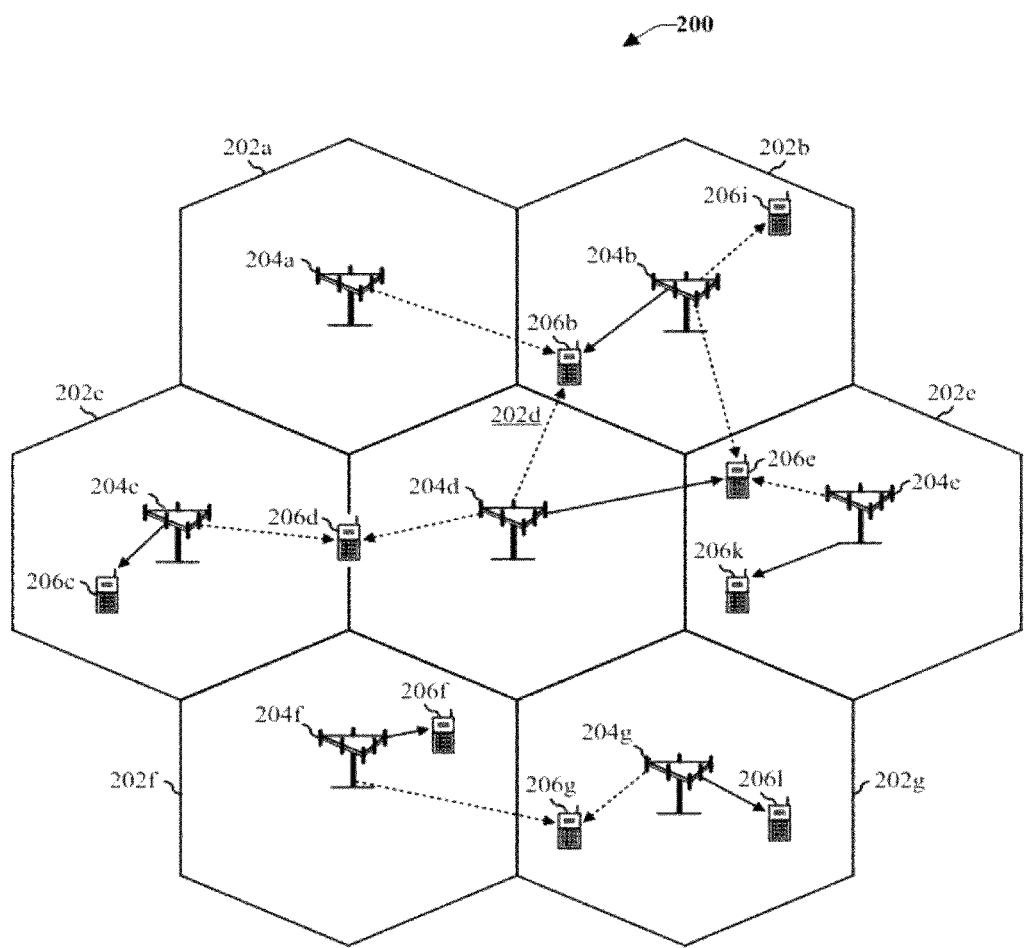
FIG. 2 is an illustration of another example wireless communication system facilitating PRACH processing in accordance with various aspects set forth herein.

FIG. 2 is an illustration of another example wireless communication system facilitating PRACH processing in accordance with various aspects set forth herein. The system 200 provides communication for multiple cells 202, such as, for example, macro cells 202A-202G, with each cell being serviced by a corresponding BS 204 (e.g., BS 204A-204G). As shown in FIG. 2, UE 206 (e.g., UEs 206A-206L) can be dispersed at various locations throughout the system over time. Each UE 206 can communicate with one or more BS 204 on a DL or a UL at a given moment, depending upon whether the UE 206 is active and whether it is in soft handoff, for example. The wireless communication system 200 may provide service over a large geographic region. For example, macro cells 202A-202G may cover a few blocks in a neighborhood.

Figure 3:
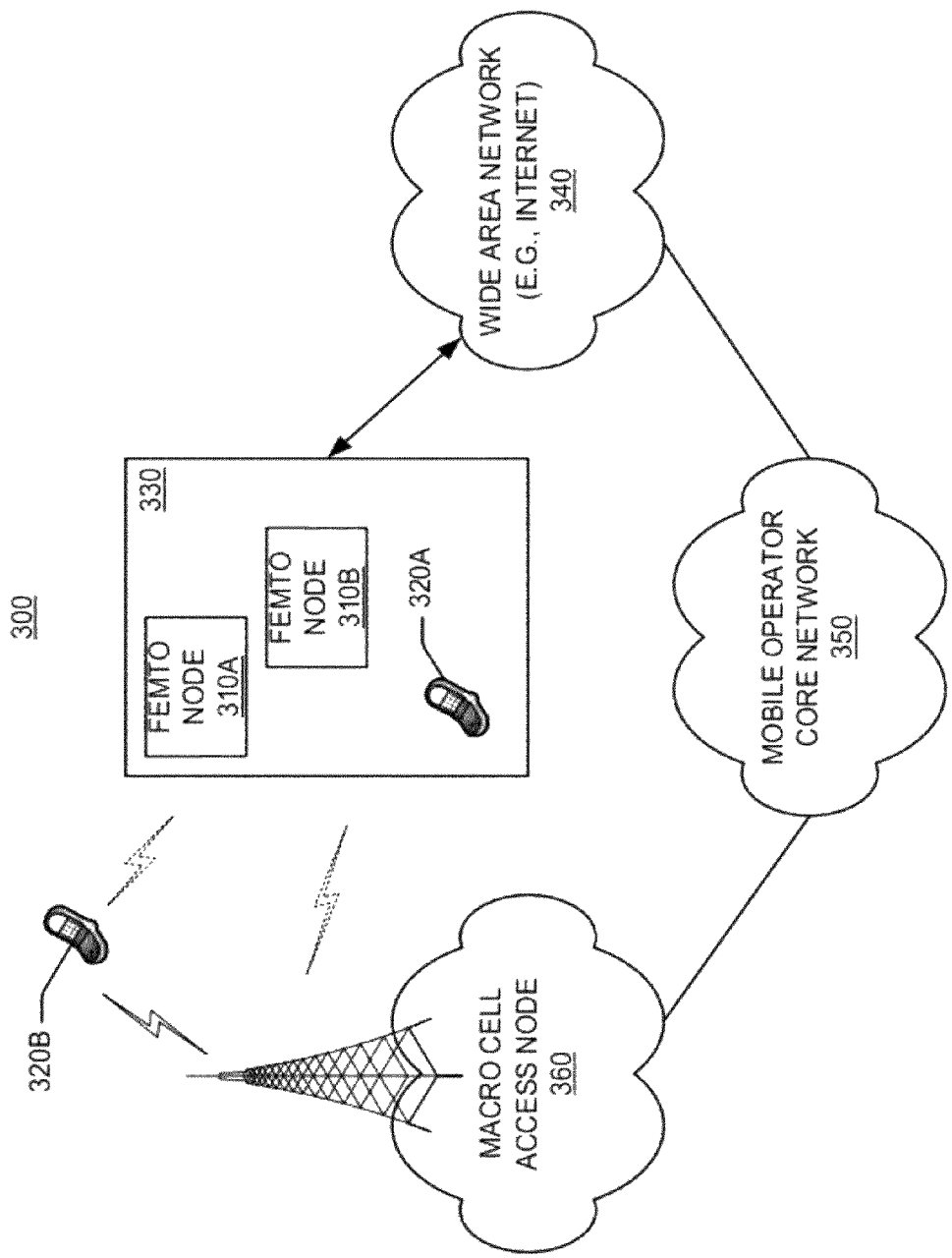
FIG. 3 is an illustration of an example wireless communication system where one or more Femto nodes are deployed for facilitating PRACH processing in accordance with various aspects set forth herein.

FIG. 3 is an illustration of an example wireless communication system where one or more Femto nodes are deployed for facilitating PRACH processing in accordance with various aspects set forth herein. Specifically, the system 300 includes multiple Femto nodes 310 (e.g., Femto nodes 310A and 310B) installed in a relatively small scale network environment (e.g., in one or more user residences 330). Each Femto node 310 can be coupled to a wide area network 340 (e.g., the Internet) and a mobile operator core network 350 via a DSL router, a cable modem, a wireless link, or other connectivity means (not shown). As will be discussed below, each Femto node 310 can be configured to serve associated UEs (e.g., associated UE 320A) and, optionally, alien UEs (e.g., alien UE 320B). In other words, access to Femto nodes 310 may be restricted whereby a given UE 320 can be served by a set of designated (e.g., home) Femto node(s) 310 but may not be served by any non-designated Femto nodes 310 (e.g., a neighbor's Femto node 310).

However, in various embodiments, an associated UE 320A can experience interference on the DL from a Femto node 310 serving an alien UE 320B. Similarly, a Femto node 310 associated with associated UE 320A can experience interference on the UL from the alien UE 320B. In embodiments, interference management can be facilitated in the system 300 as described herein.

Figure 4:
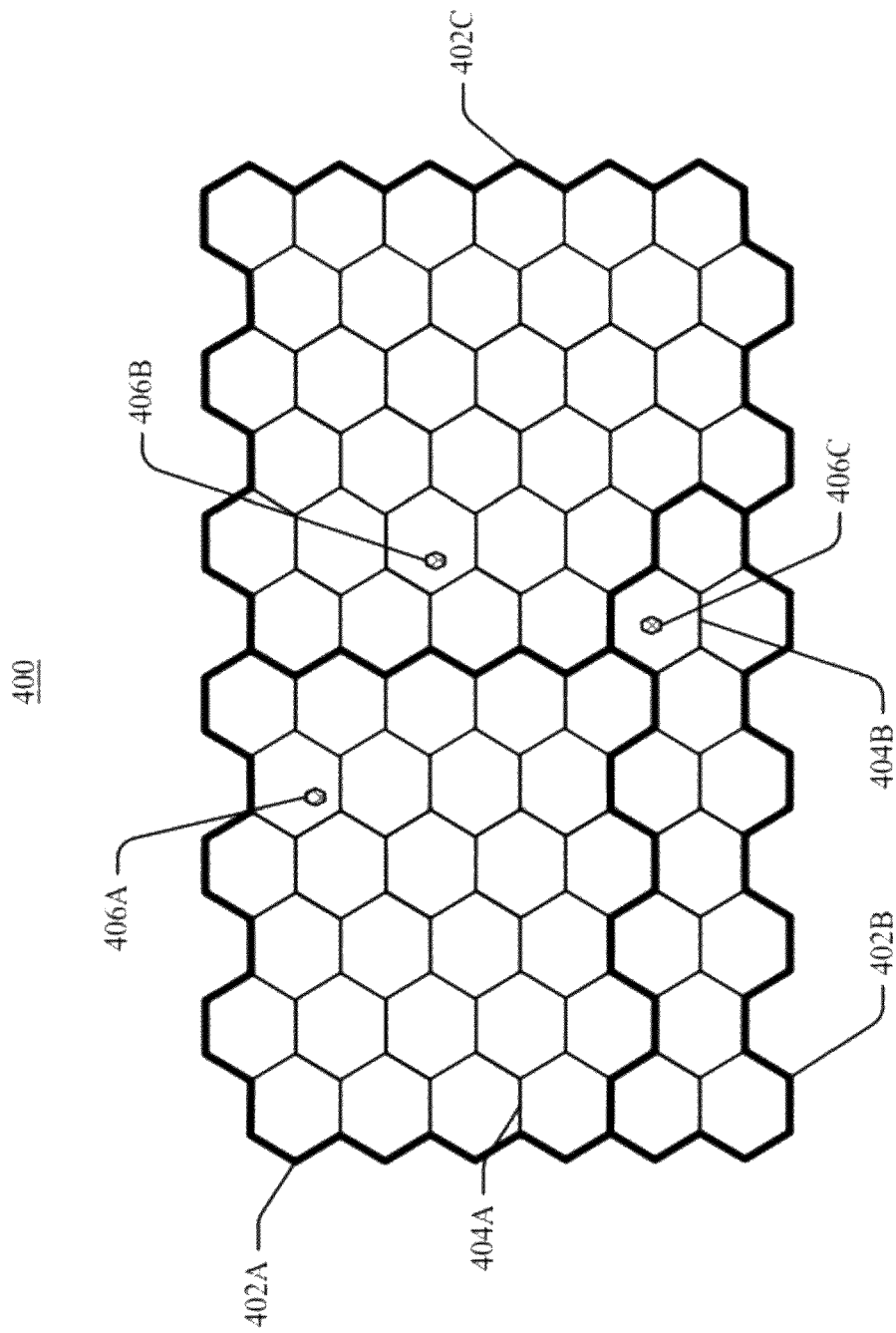
FIG. 4 is an illustration of an example coverage map in a wireless communication system for facilitating PRACH processing in accordance with various aspects set forth herein.

FIG. 4 is an illustration of an example coverage map in a wireless communication system for facilitating PRACH processing in accordance with various aspects set forth herein. The coverage map 400 can include several tracking areas 402 (or routing areas or location areas), each of which can include several macro coverage areas. In the embodiment shown, areas of coverage associated with tracking areas 402A, 402B, and 402C are delineated by the wide lines and the macro coverage areas 404 are represented by the hexagons. The tracking areas 402A, 402B, and 402C can include Femto coverage areas 406. In this example, each of the Femto coverage areas 406 (e.g., Femto coverage area 406C) is depicted within a macro coverage area 404 (e.g., macro coverage area 404B). It should be appreciated, however, that a Femto coverage area 406 may not lie entirely within a macro coverage area 404. In practice, a large number of Femto coverage areas 406 can be defined with a given tracking area 402 or macro coverage area 404. Also, one or more Pico coverage areas (not shown) can be defined within a given tracking area 402 or macro coverage area 404.

Referring again to FIG. 3, the owner of a Femto node 310 can subscribe to mobile service, such as, for example, 3G mobile service, offered through the mobile operator core network 350. In addition, a UE 320 may be capable of operating both in macro environments and in smaller scale (e.g., residential) network environments. In other words, depending on the current location of the UE 320, the UE 320 may be served by an access node 360 of the mobile operator core network 350 or by any one of a set of Femto nodes 310 (e.g., the Femto nodes 310A and 310B that reside within a corresponding user residence 330). For example, when a subscriber is outside his home, he is served by a standard macro cell AP (e.g., node 360) and when the subscriber is at home, he is served by a Femto node (e.g., node 310A). Here, it should be appreciated that a Femto node 310 may be backward compatible with existing UEs 320.

A Femto node 310 may be deployed on a single frequency or, in the alternative, on multiple frequencies. Depending on the particular configuration, the single frequency or one or more of the multiple frequencies can overlap with one or more frequencies used by a Macro node (e.g., node 360).

In some aspects, a UE 320 can be configured to connect to a preferred Femto node (e.g., the home Femto node of the UE 320) whenever such connectivity is possible. For example, whenever the UE 320 is within the user residence 330, it may be desired that the UE 320 communicate only with the home Femto node 310.

In some aspects, if the UE 320 operates within the mobile operator core network 350 but is not residing on its most preferred network (e.g., as defined in a preferred roaming list), the UE 320 may continue to search for the most preferred network (e.g., the preferred Femto node 310) using a Better System Reselection (BSR), which can involve a periodic scanning of available systems to determine whether better systems are currently available, and subsequent efforts to associate with such preferred systems. With the acquisition entry, the UE 320 may limit the search for specific band and channel. For example, the search for the most preferred system may be repeated periodically. Upon discovery of a preferred Femto node 310, the UE 320 selects the Femto node 310 for camping within its coverage area.

A Femto node may be restricted in some aspects. For example, a given Femto node may only provide certain services to certain UEs. In deployments with so-called restricted (or closed) association, a given UE may only be served by the macro cell mobile network and a defined set of Femto nodes (e.g., the Femto nodes 310 that reside within the corresponding user residence 330). In some implementations, a node may be restricted to not provide, for at least one node, at least one of: signaling, data access, registration, paging, or service.

In some aspects, a restricted Femto node (which may also be referred to as a Closed Subscriber Group Home NodeB) is one that provides service to a restricted provisioned set of UEs. This set may be temporarily or permanently extended as necessary. In some aspects, a Closed Subscriber Group (CSG) may be defined as the set of BSs (e.g., Femto nodes) that share a common access control list of UEs. A channel on which all Femto nodes (or all restricted Femto nodes) in a region operate may be referred to as a Femto channel.

Various relationships may thus exist between a given Femto node and a given UE. For example, from the perspective of a UE, an open Femto node may refer to a Femto node with no restricted association. A restricted Femto node may refer to a Femto node that is restricted in some manner (e.g., restricted for association and/or registration). A home Femto node may refer to a Femto node on which the UE is authorized to access and operate on. A guest Femto node may refer to a Femto node on which a UE is temporarily authorized to access or operate on. An alien Femto node may refer to a Femto node on which the UE is not authorized to access or operate on, except for perhaps emergency situations (e.g., 911 calls).

From a restricted Femto node perspective, a home UE may refer to a UE that authorized to access the restricted Femto node. A guest UE may refer to a UE with temporary access to the restricted Femto node. An alien UE may refer to a UE that does not have permission to access the restricted Femto node, except for perhaps emergency situations, for example, such as 911 calls (e.g., a UE that does not have the credentials or permission to register with the restricted Femto node).

While the description of FIG. 4 has been provided with reference to a Femto node, it should be appreciated, that a Pico node may provide the same or similar functionality for a larger coverage area. For example, a Pico node may be restricted, a home Pico node may be defined for a given UE, and so on.

Figure 5:
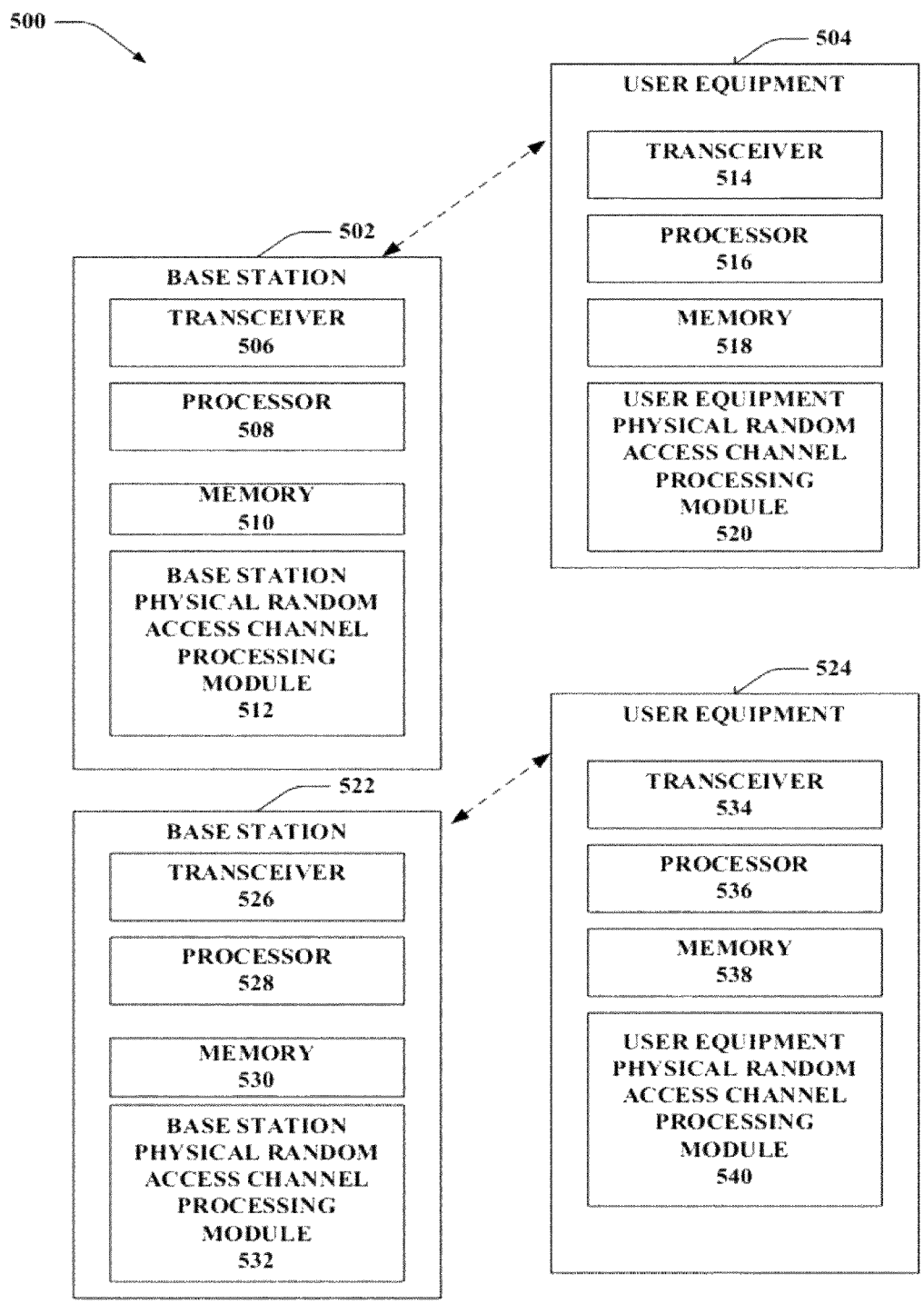
FIG. 5 is an illustration of an example block diagram of a wireless communication system for facilitating PRACH processing in accordance with various aspects set forth herein.

Referring to FIGS. 1, 2, 3, 4 and 5, methods for facilitating PRACH processing on the UL by the BS 102 can be provided, as described herein. Referring specifically to FIG. 5, in the embodiments described, the BSs 502, 522 can enable or disable a function enabling the BSs 502, 522 to send DL system information, paging information and/or a random access response without using control channel information. As such, the UEs 504, 524 that receive the DL information do not need to decode the control channel to decode a corresponding data channel. In some embodiments, the BSs 502, 522 can transmit control information for paging information and/or system information as in LTE Release 8 systems.

BSs 502, 522 and UEs 504, 524 can be configured to operate according to the methods described herein. In particular, BS 502 and UE 504 can be communicatively coupled and located within a single cell. For example, the cell can be a pico cell or a Femto cell. By contrast, BS 522 and UE 524 can be communicatively coupled and located within another cell. For example, BS 522 and UE 524 can be located in a macro cell. Accordingly, while the description below discusses BS 522, the BS 522 can be a macro cell AP such as BS 522 described with reference to FIG. 3.

As shown in FIG. 5, the UEs 504, 524 can be configured to transmit to BSs 502, 522, respectively, information on the PRACH. In some embodiments, the BSs 502, 522 can be configured to receive the PRACH information or other downlink information such that the information on the PRACH channel for the BS 502 collides with the information on the PRACH channel for the BS 522.

BSs 502, 522 can include transceivers 506, 516 configured to transmit and receive data and/or control information and/or any other type of information described herein with reference to any of the systems, methods, apparatus and/or computer program products to and from UEs 504, 524, respectively. Transceivers 506, 516 can be configured to transmit data and control channel information. For example, on the UL, the control channels can be the PRACH and/or the PUSCH.

BSs 502, 522 can also include processors 508, 528 and memory 510, 530. Processors 508, 528 can be configured to perform one or more of the functions described herein with reference to any of the systems, methods, apparatus and/or computer program products. The BSs 502, 522 can include memory 510, 530, respectively. The memory 510, 530 can be for storing computer-executable instructions and/or information for performing the functions described herein with reference to any of the systems, methods, apparatus and/or computer program products.

BSs 502, 522 can also include BS PRACH processing modules 512, 532 configured to perform PRACH processing including, but not limited to, receiving the PRACH for the BS 502 such that the PRACH collides with the PRACH for the BS 522 but not with the PUSCH for BS 522.

The UEs 504, 524 can include transceivers 514, 534 configured to transmit and receive data and/or control information and/or any other type of information described herein with reference to any of the systems, methods, apparatus and/or computer program products to and from BSs 502, 522, respectively. In some embodiments, the control information is transmitted on a control channel, including, but not limited to, a PRACH and/or a PUSCH.

UEs 504, 524 can also include processors 516, 536 and memory 518, 538. Processors 516, 536 can be configured to perform one or more of the functions described herein with reference to any of the systems, methods, apparatus and/or computer program products. The UEs 504, 524 can include memory 518, 538 respectively. The memory 518, 538 can be for storing computer-executable instructions and/or information for performing the functions described herein with reference to any of the systems, methods, apparatus and/or computer program products.

UEs 504, 524 can also include UE PRACH processing modules 520, 540 configured to transmit information on the PRACH and/or for PRACH processing. In some embodiments, the UE PRACH processing modules 520, 540 is configured to transmit information such that the PRACH from the UE 504 collides with a PRACH from UE 524.

As PRACH sequences used by the BSs and/or BS 522s can have good correlation properties, if the PRACH transmission for a BS collides with the PRACH transmission for a BS 522, the effects of the interference can be mitigated to some extent by de-spreading.

Furthermore, the BS 502 can apply advanced receiver techniques to cancel out the strong interference. In various embodiments, the BS 502 can apply methods for cancellation of interference by strong PRACH signals. Further, in some embodiments, the BS 502 can employ frequency domain matched filtering techniques. In particular, the time domain signal received by the BS 502 is extracted and down sampled, and the cyclic prefix is removed from the extracted and down sampled time domain signal. The resultant signal is converted into a frequency domain representation. In another embodiment, for multi-segment processing, which can be employed for high Doppler scenarios, the time domain samples can be divided into multiple segments, zero padding of each segment can then be performed, and the segments of the resultant signal can then be converted into a frequency domain representation. In either the single segment or multi-segment embodiments, the frequency domain representation can be matched with Zadoff-Chu sequences in the frequency domain and the matched output can be converted back into the time domain representation to obtain all the correlation metrics within one root.

The BS 502 receiver techniques can be employed by the BS 502 knowing only the starting root index and the cyclic shift separation of the BS 522.

If the BS 502 PRACH collides with the physical uplink shared channel (PUSCH) of the BS 522, the BS 502 PRACH can be more vulnerable to the BS 522 interference, as there may not be good correlation between PRACH and PUSCH sequences. Moreover, with various different types of receivers, the BS 502 may need to know the dynamic physical downlink control channel (PDCCH) to carry out the interference cancellation, and which can cause additional overhead.

The system can be designed such that the BS 502 PRACH collides with the BS 522 PRACH.

In some embodiments, the BS 502 can have the PRACH transmitted on the same set of resource blocks (RBs) while the BS 502 uses a full or subset of the time configuration of the BS 522. As one example of such, the BS 522 can use the PRACH configuration index 13. As such the BS 522 can have a PRACH transmission every odd subframe with format 0.

In some embodiments, the BS 502 can use configuration index 0/2/3/5/13/15 so that the PRACH transmitted in the BS 502 cell will collide with the PRACH transmitted in the BS 522 cell. This approach can assume that the BS 522 PRACH is transmitted using index 13. In some embodiments, the BS 502 can use format 0 while the BS 522 can use format 0/1/2/3 with the current PRACH structure.

Figure 6:
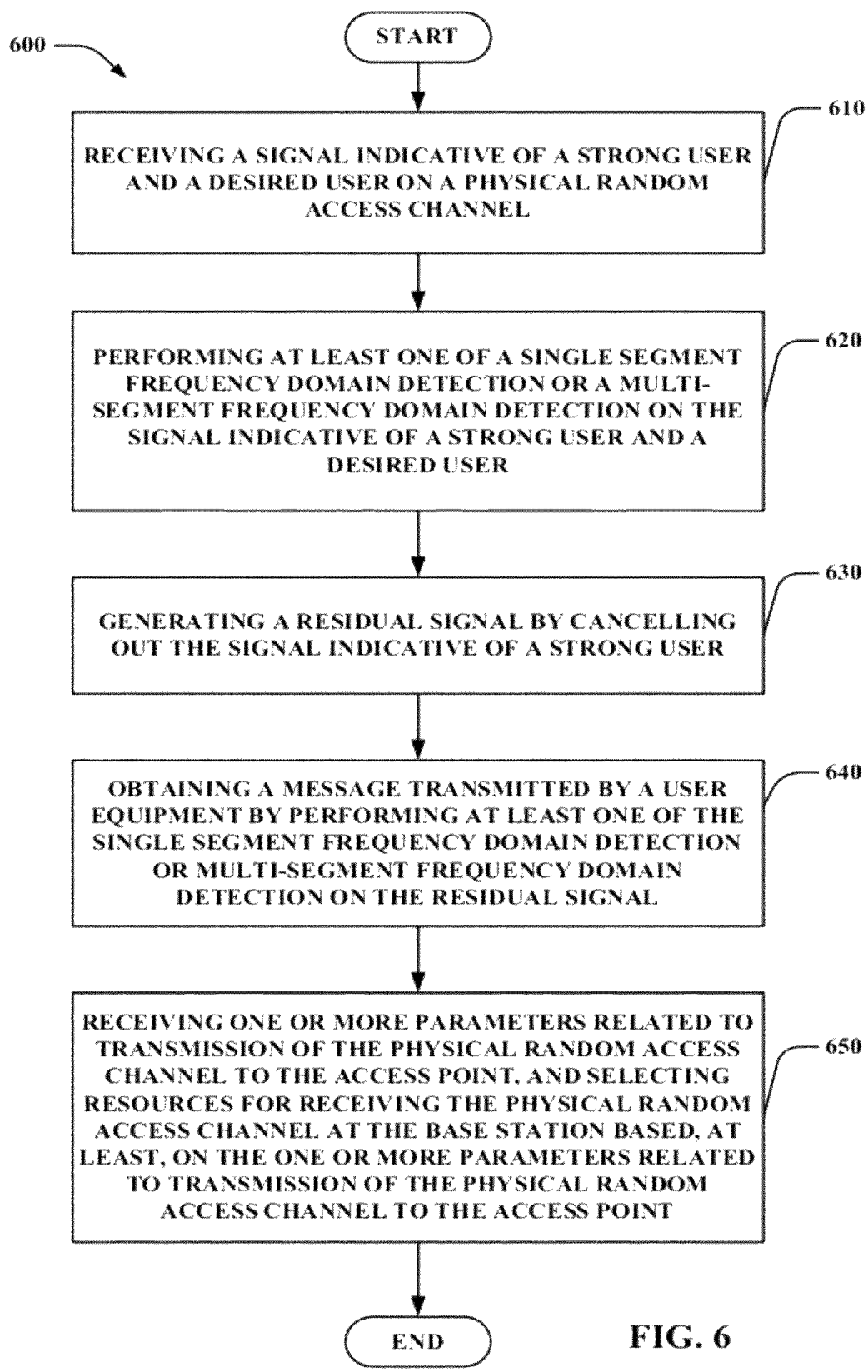
FIG. 6 is an illustration of an example of a flowchart of a method for facilitating PRACH processing in accordance with various aspects set forth herein.

FIG. 6 is an illustration of an example of a flowchart of a method for facilitating PRACH processing in accordance with various aspects set forth herein. At 610, method 600 can include receiving a signal indicative of a strong user and a desired user on a physical random access channel.

At 620, method 600 can include performing at least one of a single segment frequency domain detection or a multi-segment frequency domain detection on the signal indicative of a strong user and a desired user.

In some embodiments, the frequency domain detection is single segment frequency domain detection comprising performing a cyclic cross-correlation with a local replica of the random access sequence. Single segment correlation can be utilized within this detection, as described below, to facilitate PRACH processing in low Doppler and small frequency offset scenarios).

The detection can also include determining a random access channel signal at a selected antenna of a base station, wherein the base station is configured to perform the determining. In some embodiments, the received RACH signal at the $r^{th}$ antenna can be expressed as equation 1:

$$y_r = [y_0, y_1, \ldots, y_{L-1}]^T, L=1023 \quad (1)$$

where $y_r$ is the received RACH signal at the rth antenna, L is the length of the received vector and T is the transverse operator.

The detection can also include performing a segment correlation for a selected root associated with the random access sequence. In some embodiments, a single segment correlation for the kth root can be expressed as equation 2:

$$r_{k,r} = y_r \otimes f^*_k \quad (2)$$

where $r_{k,r}$ is the single segment correlation for the kth root and $f_k$ can be a random access sequence.

Equation 2 can be implemented as frequency domain sequence matching as shown in equation 3:

$$R_{k,r} \leq y_r \square F^*_k \quad (3)$$

where R, Y and F are the frequency domain representations of r, y and f and the symbol between Y and F represents multiplication for obtaining the product in the frequency domain of the two values.

In some embodiments, the frequency domain detection can be multi-segment frequency domain detection and can include dividing the signal indicative of a strong user and a desired user on a physical random access channel into multiple segments. The detection can also include performing frequency domain matching on zero padded versions of the multiple segments. The detection can also include performing circular correlation via frequency domain multiplication.

The detection can also include estimating channel estimates per segment, and generating a channel frequency response per segment.

The detection can also include obtaining a plurality of frequency domain products, wherein the frequency domain products are products of channel frequency responses and results of performing the multi-segment frequency domain detection on multiple segments of the signal indicative of a strong user and a desired user, wherein each of the channel frequency responses are based, at least, on the plurality of channel estimates for the strong user.

The detection can also include generating residual signals by subtracting the frequency domain products from respective multi-segment frequency domain detection on multiple segments of the signal indicative of a strong user and a desired user.

In some embodiments, the multi-segment frequency domain detection can be for high Doppler and/or large frequency offset scenarios. In some embodiments, multi-segment frequency domain detection can include dividing the received samples into multiple segments. For the case of two segments, the received signal can be expressed as shown in Equation 4:

$$y_r = [y_{1,r}^T y_{2,r}^T]^T \quad (4)$$

The next step for multi-segment frequency domain detection can include zero padding the segments. The next step for multi-segment frequency domain detection can include frequency domain matching with each zero padded segment, which can be expressed as in Equations 5, 6 and 7:

$$r_{k,r} = \left[ \left| [y_{1,r}^T \; 0]^T \otimes f_k^* \right|^2 + \left| [0 \; y_{2,r}^T]^T \otimes f_k^* \right|^2 \right]^{1/2} \quad (5)$$
$$= [|r_{k,r,1}|^2 + |r_{k,r,2}|^2]^{1/2}$$

$$r_{k,r,1} = y_{r,1} \otimes f_k^* \quad r_{k,r,2} = y_{r,2} \otimes f_k^* \quad (6)$$

$$y_{r,1} = [y_{1,r}^T \; 0]^T \quad y_{r,2} = [0 \; y_{2,r}^T]^T \quad (7)$$

The next step for multi-segment frequency domain detection can include Circular correlation can be implemented as frequency domain multiplication, which can be expressed as shown in Equation 8:

$$R_{k,r,1} = Y_{r,1} \square F^*_k \; R_{k,r,2} = Y_{r,2} \square F^*_k \quad (8)$$

At 630, method 600 can include generating a residual signal by cancelling out the signal indicative of a strong user.

In single-segment scenarios, generating a residual signal can include obtaining channel estimates for the strong user. In doing so, the method can assume the detected root sequence is $k_0$ and the timing is $t_0$ for the strong user. With single segment correlation, the channel can be estimated as shown in Equation 9:

$$r_{k_0,r}(t_0-t_n, t_0+t_p) \quad (9)$$

where $t_n$ is the negative window offset and $t_p$ is the positive window offset. The channel samples outside of the window can be zeroed out as long as the window can be configured to cover the delay spread of the channel and the energy leakage due to the upsampling. In some embodiments, the window length cannot exceed the cyclic shift separation. In one embodiment, the current setting is: $t_n=5$, $t_p=10$. The channel frequency response per antenna, Hr, can be obtained by performing a fast fourier transform on the channel estimate.

Cancellation of the strong user can be carried out in time domain. For example, one embodiment can include multiplying the estimated channel response, H, with the detected sequence in frequency domain, $X(k_0, CS_0, t_0)$, where $X(k_0, CS_0, t_0)$] is obtained from the base root sequence in frequency $X(k_0, 0, 0)$] multiplied with the phase ramping associated with the detected cyclic shift, $CS_0$, and timing offset, $t_0$.

The residual signal can be computed as shown in Equation 10:

$$\hat{Y}_r = Y_r - H_r X_{k_0, cs_0, t_0} \quad (10)$$

where Y, H and X represents the frequency representations of the received signal, channel estimate and detected sequence in the frequency domains.

The residual signal is then a result of frequency domain cancellation, which saves the FFT operation on the residual signal as well as the desired sequence. The frequency domain cancellation can also obtain the detected sequence with better accuracy as $CS_0$ can be rounded in the time domain due to the up-sampling.

In multi-segment scenarios, generating a residual signal can include performing channel estimation for each of the segments. With two segment correlation, the channel per segment can be estimated as shown in Equation 11:

$$h_1(t) = r_{k_0, r, 1}(t_0 - t_n, t_0 + t_p)$$

$$h_2(t) = r_{k_0, r, 2}(t_0 - t_n, t_0 + t_p) \quad (11)$$

The window span can be larger compared to the single segment embodiment. The window span can be increased to capture more energy. For example, the current setting can be $t_n = 30$, $t_p = 35$. These settings can impose a restriction on the cyclic shift separation in the macro cell signals. Further, in the multi-segment embodiment, the Chu sequence correlation is not perfect.

For multi-segment detection, the method can also include performing a fast fourier transform to get the channel frequency response per segment: $H_{1,r}$ and $H_{2,r}$. The estimated channel responses, $H_{1,r}$ and $H_{2,r}$, can be multiplied with the detected sequence in freq domain, $X(k_0, CS_0, t_0)$.

The residual signal for multiple-segment embodiments can be as shown in Equation 12:

$$\hat{Y}_{r,1} = Y_{r,1} - H_{r,1} X_{k_0, cs_0, t_0}$$

$$\hat{Y}_{r,2} = Y_{r,2} - H_{r,2} X_{k_0, cs_0, t_0} \quad (12)$$

At 640, method 600 can include obtaining a message transmitted by a user equipment by performing at least one of the single segment frequency domain detection or multi-segment frequency domain detection on the residual signal. The detection can be performed as described above but for the residual signal. In some embodiments, the random access message can be received on the PRACH.

At 650, method 600 can include receiving one or more parameters related to transmission of the physical random access channel to the access point, and selecting resources for receiving the physical random access channel at the base station based, at least, on the one or more parameters related to transmission of the physical random access channel to the access point.

In some embodiments, the physical random access channel is received on a set of resources such that the physical random access channel for a first base station interferes with a physical random access channel for a second base station.

In some embodiments, the second base station is an access point. In some embodiments, the first base station is associated with at least one of a pico cell or a Femto cell, and wherein the second base station is associated with a macro cell.

In some embodiments, the second base station employs a configuration associated with a macro cell having a physical random access channel transmission every odd subframe with format zero.

In some embodiments, a time duration of a physical random access channel for a second base station overlaps with and is a subset of a time duration of a physical random access channel for a first base station. By way of example, but not limitation, the second base station can transmit a physical random access channel from time t to t+A. This time duration can be a subset of the physical random access channel from transmission time of the first base station. For example, the second base station can transmit a physical random access channel from every odd subframe with format 0 while the first base station can transmit a physical random access channel from every subframe or every odd subframe with format 0 OR every other subframe with format 1/2. In various embodiments, the physical random access channel from transmission from the first base station can span a time duration that is no shorter than the physical random access channel transmission from the second base station. As such, in some embodiments, the physical random access channel transmission from the first base station can be canceled to decode the physical random access channel from the second base station.

In some embodiments, the one or more parameters are received over a backhaul communicatively coupled between the base station and an access point. In some embodiments, the one or more parameters are determined by receiving, over the air, a system information block transmitted from the access point.

Figure 7:
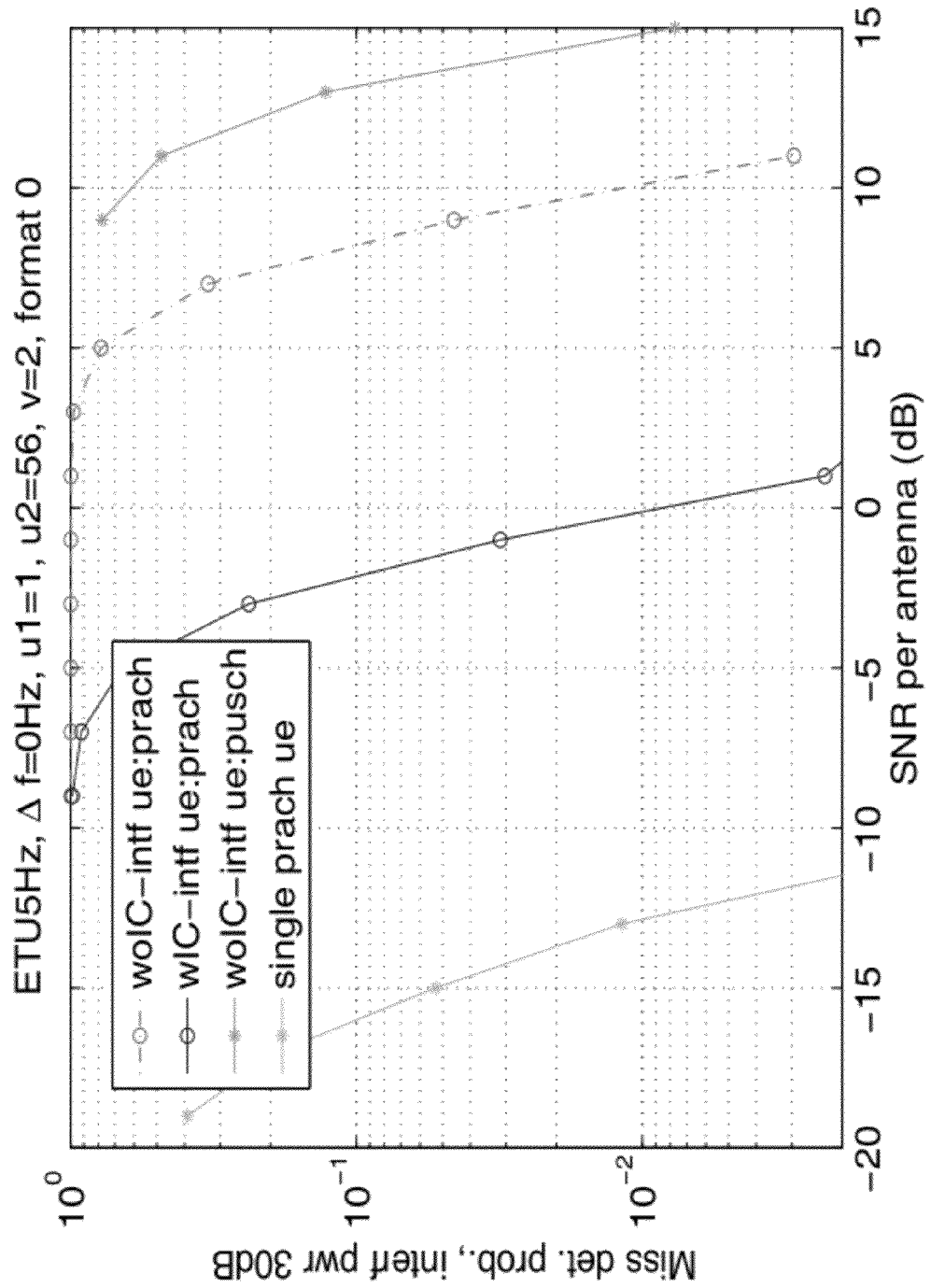
FIG. 7 is an illustration of a graph depicting simulation results of the probability of missed detection with an interference power of 30 dB power for various values of signal-to-noise ratio per antenna and employing single segment frequency domain detection.

FIG. 7 is an illustration of a graph depicting simulation results of the probability of missed detection with an interference power of 30 dB power for various values of signal-to-noise ratio per antenna and employing single segment frequency domain detection. For example, the single segment frequency domain detection can be as described above with reference to FIG. 6. The simulation results illustrate the scenario for two interfering PRACH signals and ETU 200 Hertz (Hz) and ETU 650 Hz and no frequency offset.

The simulation results illustrate the scenario for two interfering signals. As shown in the graph, which depicts performance for interfering signals on different channels transmitting at 30 dB power, the interfering signal can be transmitted on the PRACH in some embodiments, and on the physical uplink shared channel in some embodiments. For the results assuming that the interfering signal is on the physical uplink shared channel, no cancellation of the physical uplink shared channel is performed. As can be seen, the simulation employing interference with the PRACH and employing interference cancellation has an improved gain relative to the simulation with the PRACH and no interference cancellation.

It is assumed that strong and weak signals use different root sequences from one another. Additionally, non-zero timing offsets and non-zero cyclic shifts are assumed for both signals. In some embodiments, the zero cyclic shift does not have an upsampling effect and the performance can be better with non-zero cyclic shift.

The simulations also assume ETU 5 Hz and no frequency offset. Further, the simulation results illustrate embodiments for which detection employs taking the peak of the correlation (no thresholding is currently performed).

The Additive White Gaussian Noise (AWGN)/flat fading channels can have better results with more accurate timing detection of the strong user and more accurate channel estimation. Various other cancellation methods may be employed to address embodiments with non-zero frequency offset since the method 600 does not include detection of frequency offset and therefore cannot be compensated. Additionally, false alarm thresholds can be identified as the system can be very sensitive due to the residual interference from the strong signal. This can be the case for high speed and/or large frequency offset embodiments.

An analysis of FIG. 7 results in a number of design concepts for improving PRACH processing at a BS. For example, in some embodiments, the PRACH for the BS can be transmitted and/or received such that the PRACH for the BS is interfered with by the PRACH for a BS or AP of another cell (e.g., a macro BS) instead of being interfered with by a physical uplink shared channel. The effects of interference are mitigated for the PRACH when the PRACH experiences interference from another PRACH.

To effect the above-described interference, a number of approaches can be taken and assume that the PRACH sequences have good correlation properties.

One approach can be to have a pico cell or Femto cell that transmits the PRACH on the same set of resource blocks while the pico cell or Femto cell use a full or subset of the time configuration of a macro cell. By way of example, but not limitation, the macro cell can use the PRACH configuration index 13, which means that the macro cell can have PRACH transmission every odd subframe with format 0. Further, the pico cell or Femto cell can use a configuration index 0/2/3/5/13/15 so that the pico cell or Femto cell PRACH will collide with the PRACH associated with the macro cell.

In some embodiments, the pico cell or Femto cell can use format 0 while the macro cells uses format 0/1/2/3 with the current PRACH structure.

Another approach can be to have the pico cell or the Femto cell know the PRACH parameters associated with the macro cell. In some embodiments, if there is X2 backhaul, the pico cell or Femto cell can read the PRACH information via the backhaul. In some embodiments, if there is no X2 information exchange between the macro cell and the pico cell or Femto cell, the pico cell or Femto cell can read the system information block from the macro cell over the air to obtain starting root index and Ncs configuration information. The Ncs configuration information can include information regarding cyclic shifts of a Zadoff-Chu sequence.

No strict synchronization is required across cells. Further, for format 4 which is used in time division duplexing (TDD) where the system is synchronized, the other PRACH formats can have fairly large cyclic prefix (CP) and guard time (GT). In some embodiments, the round-trip delay (RTD) of the interfering PRACH from the macro UEs to the pico cell or Femto cell will not use up all the cyclic prefix (CP) length so fairly loose synchronization can be employed.

Figure 8:
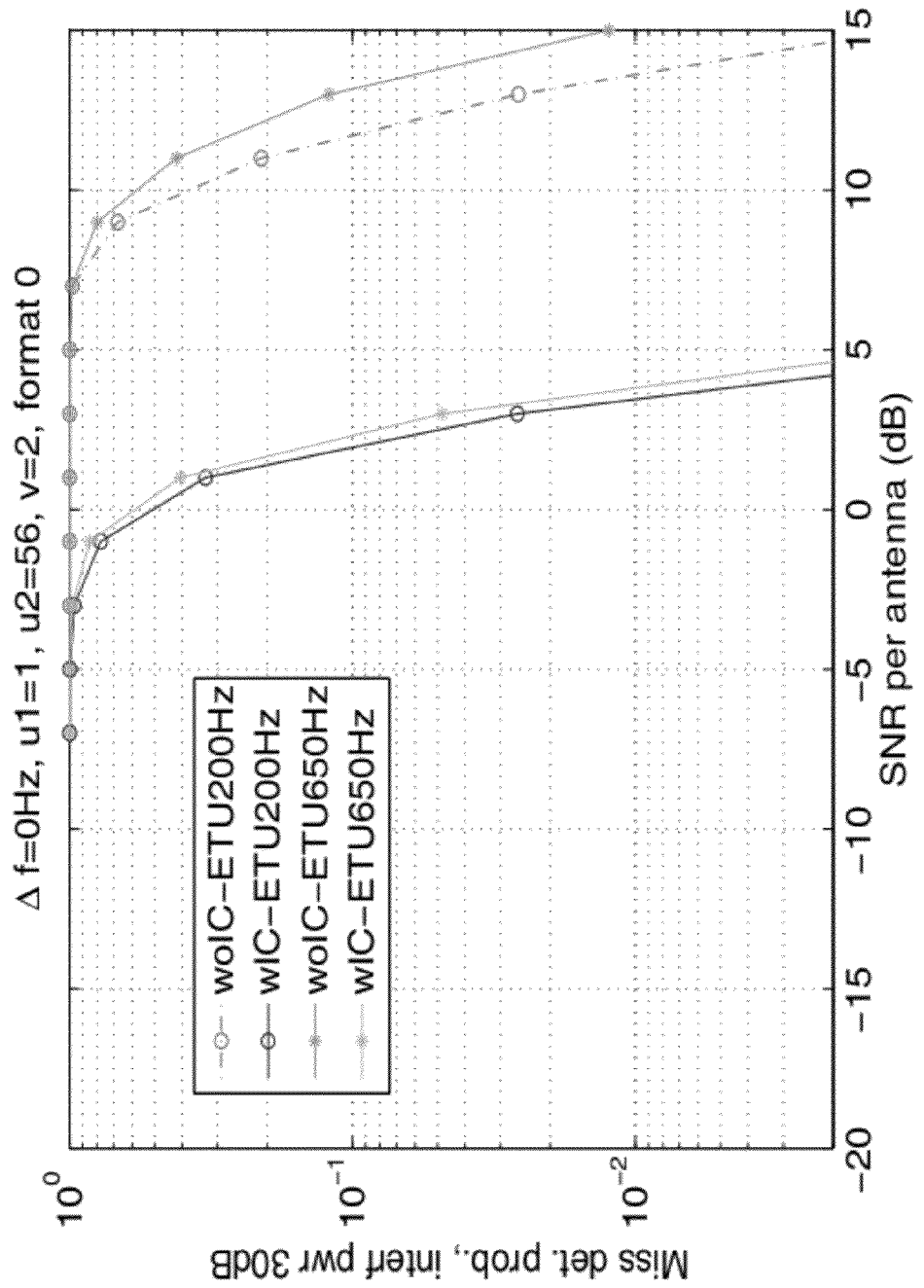
FIG. 8 is an illustration of a graph depicting simulation results of the probability of missed detection with an interference power of 30 dB power for various values of signal-to-noise ratio per antenna and employing multi-segment frequency domain detection.
Figure 9:
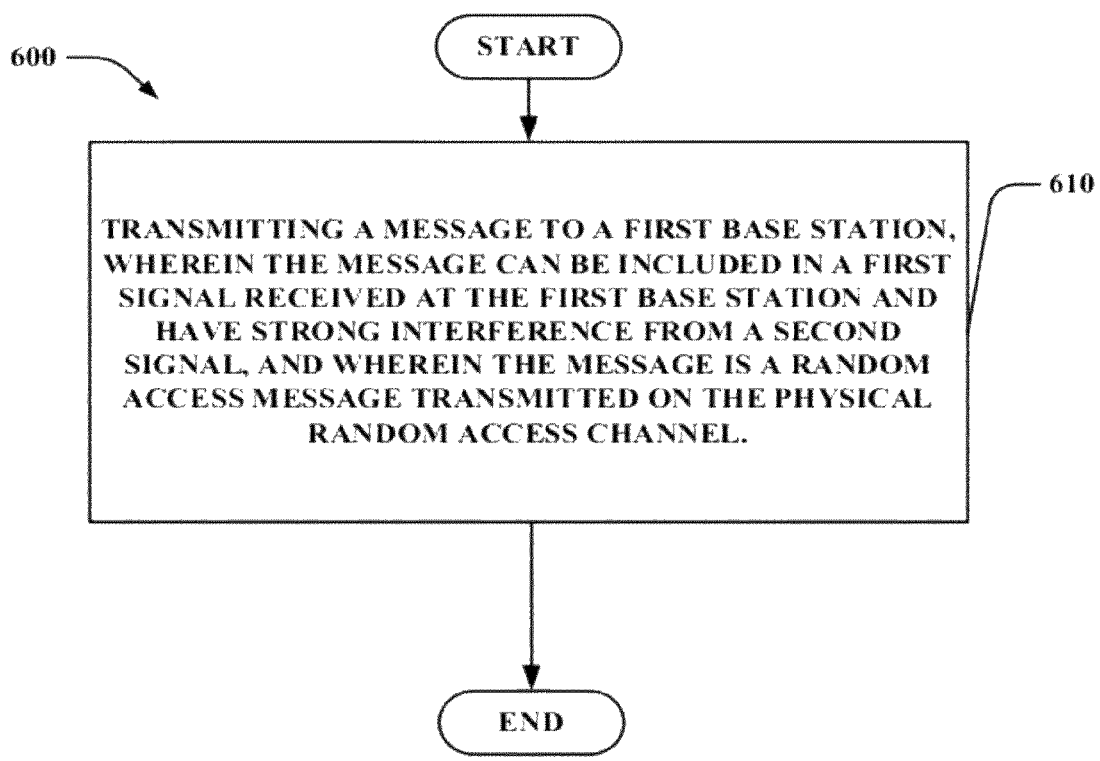
FIG. 9 is an illustration of an example of a flowchart of a method for facilitating PRACH processing in accordance with various aspects set forth herein.

FIG. 8 is an illustration of a graph depicting simulation results of the probability of missed detection with an interference power of 30 dB power for various values of signal-to-noise ratio per antenna and employing multi-segment frequency domain detection. For example, the multi-segment frequency domain detection can be as described above with reference to FIG. 6. The simulation results illustrate the scenario for two interfering PRACH signals and ETU 200 Hertz (Hz) and ETU 650 Hz and no frequency offset. The simulation results illustrate the FIG. 9 is an illustration of an example of a flowchart of a method for facilitating PRACH processing in accordance with various aspects set forth herein. The method 900 can be performed by a UE configured to transmit on the PRACH.

At 910, method 900 can include transmitting a message to a first base station. The message can be included in a first signal received at the first base station and having strong interference from a second signal. The message can be a random access message transmitted on the PRACH.

In some embodiments, the second signal can be transmitted to a second base station, and the PRACH can be transmitted on a set of resources such that the PRACH for the first base station interferes with a PRACH for the second base station.

In some embodiments, the first base station is at least one of a pico cell base station or a Femto cell base station and the second base station is a macro cell base station. In some embodiments, the first base station is configured to manage a cell of a first type and the second base station is configured to manage a cell of a second type.

Figure 10:
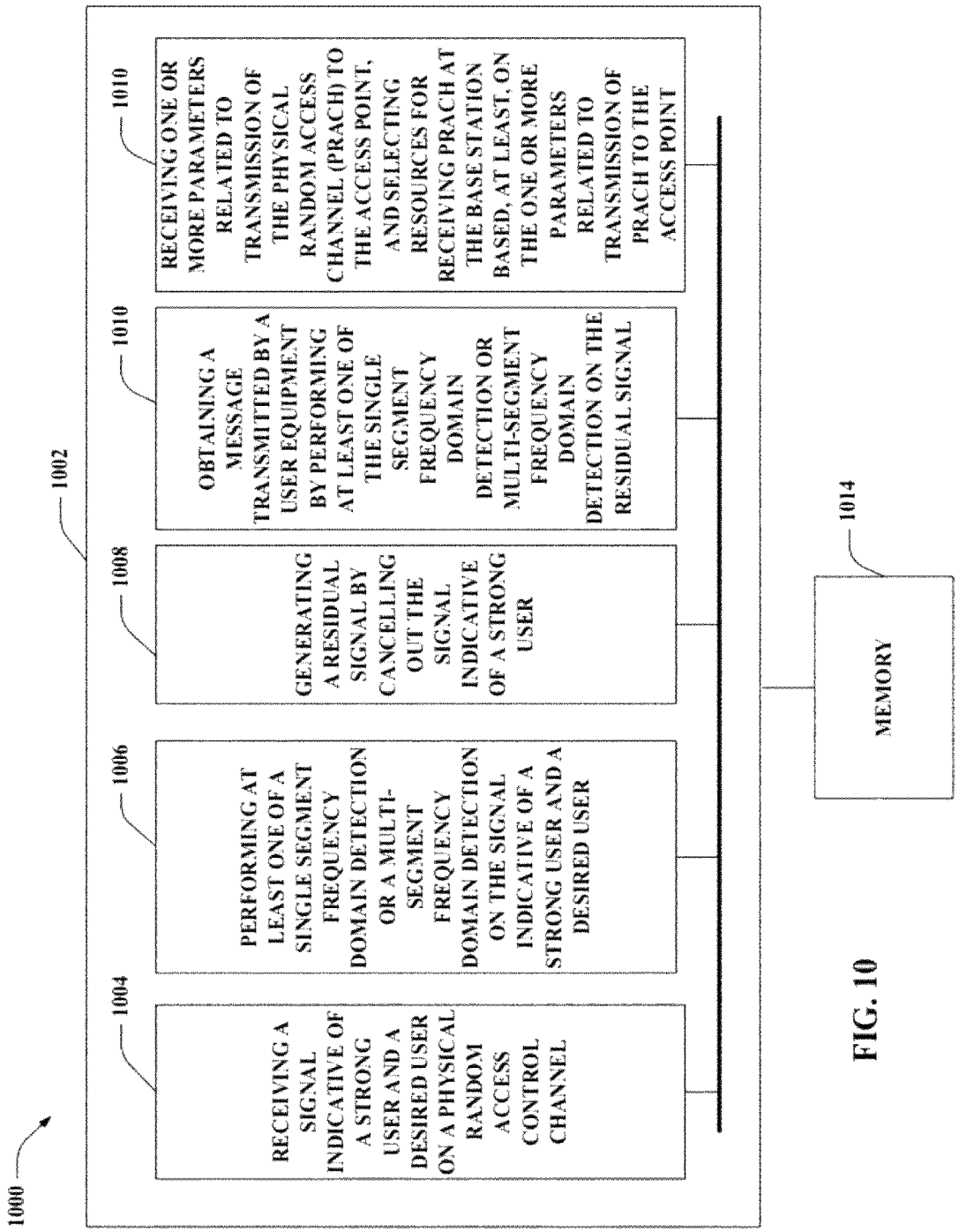
FIGS. 10 and 11 are illustrations of block diagrams of example systems for facilitating PRACH processing in accordance with various aspects set forth herein.

FIG. 10 is an illustration of a block diagram of an example system facilitating PRACH processing in accordance with various aspects set forth herein. It is to be appreciated that system 1000 is represented as including functional blocks, which can be functional blocks that represent functions implemented by a processor, hardware, software, firmware, or combination thereof. System 1000 can include a logical or physical grouping 1002 of electrical components for facilitating the PRACH processing.

The electrical components can act in conjunction. For instance, the logical or physical grouping 1002 can include an electrical component 1004 for receiving a signal indicative of a strong user and a desired user on a PRACH.

The logical or physical grouping 1002 can also include an electrical component 1006 for performing at least one of a single segment frequency domain detection or a multi-segment frequency domain detection on the signal indicative of a strong user and a desired user. The logical or physical grouping 1002 can also include an electrical component 1008 for generating a residual signal by cancelling out the signal indicative of a strong user.

The logical or physical grouping 1002 can include an electrical component 1010 for obtaining a message transmitted by a user equipment by performing at least one of the single segment frequency domain detection or multi-segment frequency domain detection on the residual signal.

The logical or physical grouping 1002 can include an electrical component 1012 for receiving one or more parameters related to transmission of the PRACH to the access point, and selecting resources for receiving the PRACH at the base station based, at least, on the one or more parameters related to transmission of the PRACH to the access point.

The logical or physical grouping 1002 can include an electrical component 1014 for storing. The electrical component 1014 for storing parameters related to transmission of the PRACH, information for performing cancellation, single segment and/or multi-segment frequency domain detection.

Figure 11:
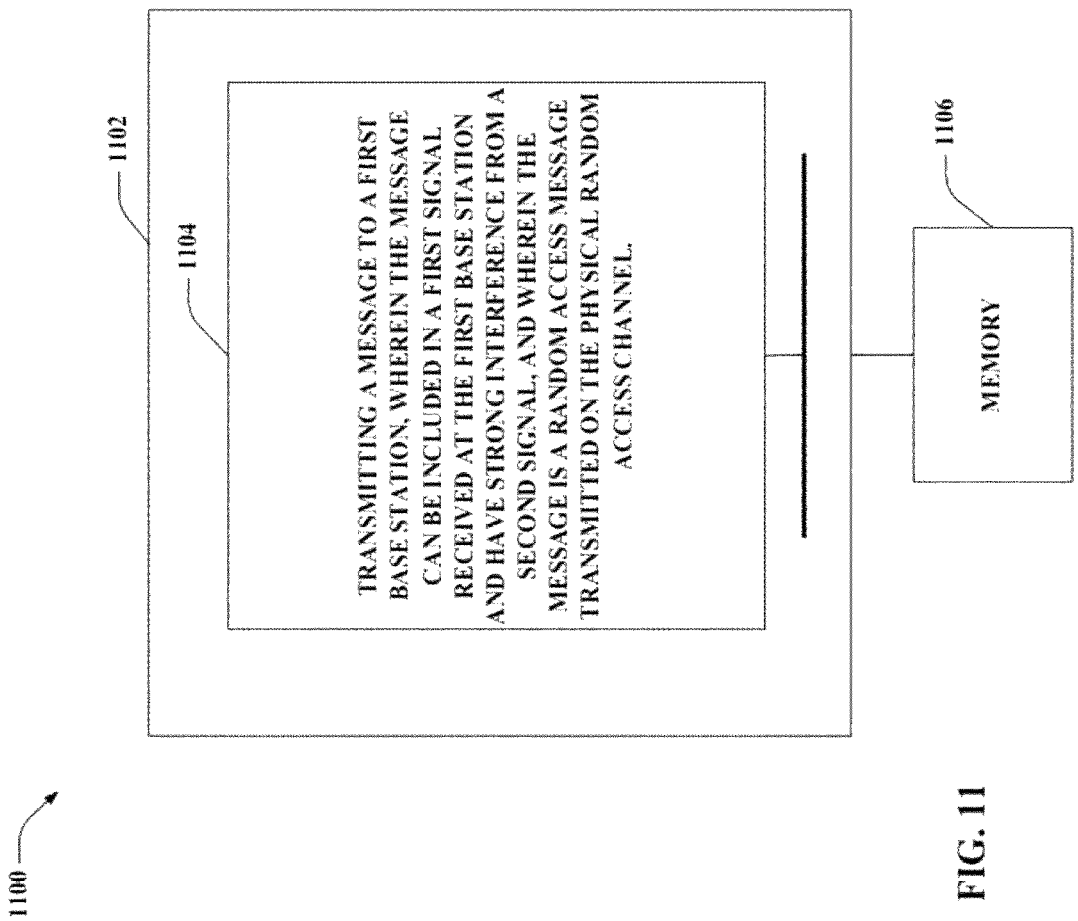

FIG. 11 is an illustration of a block diagram of an example system facilitating PRACH processing in accordance with various aspects set forth herein. It is to be appreciated that system 1100 is represented as including functional blocks, which can be functional blocks that represent functions implemented by a processor, hardware, software, firmware, or combination thereof. System 1100 can include a logical or physical grouping 1102 of electrical components for facilitating the communication.

The electrical components can act in conjunction. For instance, the logical or physical grouping 1102 can include an electrical component 1104 for transmitting a message to a first base station, wherein the message is included in a first signal received at the first base station and having strong interference from a second signal, and wherein the message is a random access message transmitted on the PRACH.

In some embodiments, the second signal can be transmitted to a second base station, and the PRACH can be transmitted on a set of resources such that the PRACH for the first base station interferes with a PRACH for the second base station.

In some embodiments, the first base station is at least one of a pico cell base station or a Femto cell base station and the second base station is a macro cell base station. In some embodiments, the first base station is configured to manage a cell of a first type and the second base station is configured to manage a cell of a second type.

The logical or physical grouping 1102 can include an electrical component 1106 for storing. The electrical component 1106 for storing can include memory for storing a message transmitted on the PRACH, for example.

A wireless multiple-access communication system can simultaneously support communication for multiple wireless access terminals. As mentioned above, each terminal can communicate with one or more BSs via transmissions on the forward and reverse links. The forward link (or downlink) refers to the communication link from the BSs to the terminals, and the reverse link (or uplink) refers to the communication link from the terminals to the BSs. This communication link can be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas can be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system can support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 12:
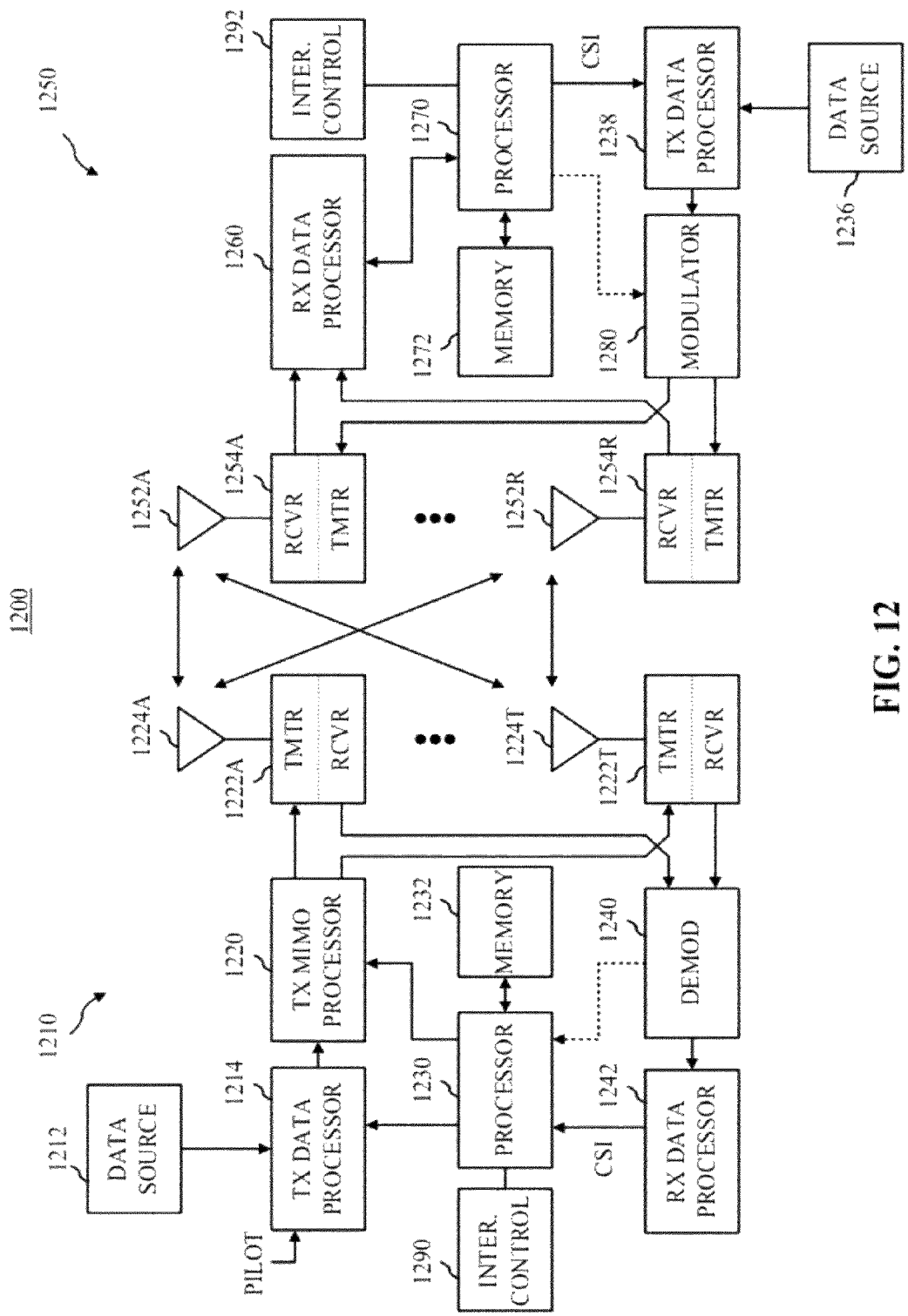
FIG. 12 shows an example wireless communication system in which the embodiments described herein can be employed in accordance with various aspects set forth herein.

FIG. 12 shows an example wireless communication system in which the embodiments described herein can be employed in accordance with various aspects set forth herein. The teachings herein may be incorporated into a node (e.g., a device) employing various components for communicating with at least one other node. FIG. 12 depicts several sample components that may be employed to facilitate communication between nodes. Specifically, FIG. 12 illustrates a wireless device 1210 (e.g., an access point) and a wireless device 1250 (e.g., an access terminal) of a wireless communication system 1200 (e.g., MIMO system). At the device 1210, traffic data for a number of data streams is provided from a data source 1212 to a transmit (TX) data processor 1214.

In some aspects, each data stream is transmitted over a respective transmit antenna. The TX data processor 1214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1230. A data memory 1232 may store program code, data, and other information used by the processor 1230 or other components of the device 1210.

The modulation symbols for all data streams are then provided to a TX MIMO processor 1220, which may further process the modulation symbols (e.g., for OFDM). The TX MIMO processor 1220 then provides $N_T$ modulation symbol streams to $N_T$ transceivers (XCVR) 1222A through 1222T. In some aspects, the TX MIMO processor 1220 applies beam-forming weights to the symbols of the data streams and to the antenna from which the symbol is being transmitted.

Each transceiver 1222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1222A through 1222T are then transmitted from $N_T$ antennas 1224A through 1224T, respectively.

At the device 1250, the transmitted modulated signals are received by $N_R$ antennas 1252A through 1252R and the received signal from each antenna 1252 is provided to a respective transceiver (XCVR) 1254A through 1254R. Each transceiver 1254 conditions (e.g., filters, amplifies, and downconverts) a respective received signal, digitizes the conditioned signal to provide samples, and further processes the samples to provide a corresponding "received" symbol stream.

A receive (RX) data processor 1260 then receives and processes the $N_R$ received symbol streams from $N_R$ transceivers 1254 based on a particular receiver processing technique to provide $N_T$ "detected" symbol streams. The RX data processor 1260 then demodulates, deinterleaves, and decodes each detected symbol stream to recover the traffic data for the data stream. The processing by the RX data processor 1260 is complementary to that performed by the TX MIMO processor 1220 and the TX data processor 1214 at the device 1210.

A processor 1270 periodically determines which pre-coding matrix to use (discussed below). The processor 1270 formulates a reverse link message comprising a matrix index portion and a rank value portion. A data memory 1272 may store program code, data, and other information used by the processor 1270 or other components of the device 1250.

The reverse link message may comprise various types of information regarding the communication link and/or the received data stream. The reverse link message is then processed by a TX data processor 1238, which also receives traffic data for a number of data streams from a data source 1236, modulated by a modulator 1280, conditioned by the transceivers 1254A through 1254R, and transmitted back to the device 1210.

At the device 1210, the modulated signals from the device 1250 are received by the antennas 1224, conditioned by the transceivers 1222, demodulated by a demodulator (DEMOD) 1240, and processed by a RX data processor 1242 to extract the reverse link message transmitted by the device 1250. The processor 1230 then determines which pre-coding matrix to use for determining the beam-forming weights then processes the extracted message.

FIG. 12 also illustrates that the communication components may include one or more components that perform interference control operations as taught herein. For example, an interference (INTER.) control component 1290 may cooperate with the processor 1230 and/or other components of the device 1210 to send/receive signals to/from another device (e.g., device 1250) as taught herein. Similarly, an interference control component 1292 may cooperate with the processor 1270 and/or other components of the device 1250 to send/receive signals to/from another device (e.g., device 1210). It should be appreciated that for each device 1210 and 1250 the functionality of two or more of the described components may be provided by a single component. For example, a single processing component may provide the functionality of the interference control component 1290 and the processor 1230 and a single processing component may provide the functionality of the interference control component 1292 and the processor 1270.

In an aspect, logical channels can be classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can include a Multicast Control Channel (MCCH), which is a Point-to-multipoint DL channel used for transmitting Multimedia Broadcast and Multicast Service (MBMS) scheduling and control information for one or several Multicast Traffic Channels (MTCHs). Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include an MTCH for Point-to-multipoint DL channel for transmitting traffic data.

In an aspect, Transport Channels are classified into DL and UL. DL Transport Channels can include a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors and/or other electronic units designed to perform the functions described herein, or a combination thereof.

When the embodiments are implemented in software, firmware, middleware or microcode, program code or code segments, they can be stored in a machine-readable medium (or a computer-readable medium), such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for facilitating physical random access channel processing, the method comprising:
   receiving a signal indicative of a strong user and a desired user on a physical random access channel;
   performing at least one of a single segment frequency domain detection or a multi-segment frequency domain detection on the signal indicative of a strong user and a desired user;
   generating a residual signal by cancelling out the signal indicative of a strong user; and
   obtaining a message transmitted by a user equipment by performing at least one of the single segment frequency domain detection or multi-segment frequency domain detection on the residual signal.

2. The method of claim 1, wherein the message is a random access message received on the physical random access channel.

3. The method of claim 2, wherein the physical random access channel is received on a set of resources such that the physical random access channel for a first base station interferes with a physical random access channel for a second base station.

4. The method of claim 3, wherein the second base station is an access point.

5. The method of claim 3, wherein the first base station is associated with at least one of a pico cell or a Femto cell, and wherein the second base station is associated with a macro cell.

6. The method of claim 4, wherein a time duration of a physical random access channel for a second base station overlaps with and is a subset of a time duration of a physical random access channel for a first base station.

7. The method of claim 4, further comprising receiving one or more parameters related to transmission of the physical random access channel to the access point, and selecting resources for receiving the physical random access channel at the first base station based, at least, on the one or more parameters related to transmission of the physical random access channel to the access point.

8. The method of claim 7, wherein the one or more parameters are received over a backhaul communicatively coupled between the first base station and an access point.

9. The method of claim 7, wherein the one or more parameters are determined by receiving, over-the-air, a system information block transmitted from the access point.

10. The method of claim 1, wherein frequency domain detection is single segment frequency domain detection, the method further comprising:
 performing a cyclic cross-correlation with a local replica of a random access sequence;
 determining a random access channel signal at a selected antenna of a base station, wherein the base station is configured to perform the determining;
 performing a segment correlation for a selected root associated with the random access sequence; and
 performing cyclic cross correlation for each root sequence associated with the random access sequence.

11. The method of claim 10, wherein the generating a residual signal by cancelling out the signal indicative of a strong user comprises:
 determining a plurality of channel estimates for the strong user;
 performing a frequency transformation on the plurality of channel estimates for the strong user to obtain a channel frequency response per antenna of the base station;
 obtaining a frequency domain product, wherein the frequency domain product is a product of a channel frequency response and a result of performing the single segment frequency domain detection on the signal indicative of a strong user and a desired user, wherein the channel frequency response is based, at least, on the plurality of channel estimates for the strong user; and
 generating the residual signal by subtracting the frequency domain product from the single segment frequency domain detection on the signal indicative of a strong user and a desired user.

12. The method of claim 1, wherein frequency domain detection is multi-segment frequency domain detection, the method further comprising:
 dividing the signal indicative of a strong user and a desired user on a physical random access channel into multiple segments;
 performing frequency domain matching on zero padded versions of the multiple segments;
 performing circular correlation via frequency domain multiplication;
 estimating channel estimates per segment, and generating a channel frequency response per segment;
 obtaining a plurality of frequency domain products, wherein the plurality of frequency domain products are products of channel frequency responses and results of performing the multi-segment frequency domain detection on multiple segments of the signal indicative of a strong user and a desired user, wherein each of the channel frequency responses are based, at least, on a plurality of channel estimates for the strong user; and
 generating residual signals by subtracting the plurality of frequency domain products from respective multi-segment frequency domain detection on multiple segments of the signal indicative of a strong user and a desired user.

13. A computer program product, comprising:
 a non-transitory computer-readable medium, comprising:
  a first set of codes for causing a computer to receive a signal indicative of a strong user and a desired user on a physical random access channel;
  a second set of codes for causing the computer to perform at least one of a single segment frequency domain detection or a multi-segment frequency domain detection on the signal indicative of a strong user and a desired user;
  a third set of codes for causing the computer to generate a residual signal by cancelling out the signal indicative of a strong user; and
  a fourth set of codes for causing the computer to obtain a message transmitted by a user equipment by performing at least one of the single segment frequency domain detection or multi-segment frequency domain detection on the residual signal.

14. The computer program product of claim 13, wherein the message is a random access message received on the physical random access channel.

15. The computer program product of claim 14, wherein the physical random access channel is received on a set of resources such that the physical random access channel for a first base station interferes with a physical random access channel for a second base station.

16. The computer program product of claim 15, wherein the second base station is an access point.

17. The computer program product of claim 15, wherein the first base station is associated with at least one of a pico cell or a Femto cell, and wherein the second base station is associated with a macro cell.

18. The computer program product of claim 16, wherein a time duration of a physical random access channel for a second base station overlaps with and is a subset of a time duration of a physical random access channel for a first base station.

19. The computer program product of claim 16, further comprising a fifth set of codes for causing the computer to receive one or more parameters related to transmission of the physical random access channel to the access point, and selecting resources for receiving the physical random access channel at the first base station based, at least, on the one or more parameters related to transmission of the physical random access channel to the access point.

20. The computer program product of claim 19, wherein the one or more parameters are received over a backhaul communicatively coupled between the first base station and an access point.

21. The computer program product of claim 19, wherein the one or more parameters are determined by receiving, over-the-air, a system information block transmitted from the access point.

22. The computer program product of claim 13, wherein frequency domain detection is single segment frequency domain detection comprising:
 performing a cyclic cross-correlation with a local replica of a random access sequence;

determining a random access channel signal at a selected antenna of a base station, wherein the base station is configured to perform the determining;

performing a segment correlation for a selected root associated with the random access sequence; and performing cyclic cross correlation for each root sequence associated with the random access sequence.

23. The computer program product of claim 22, wherein the generating a residual signal by cancelling out the signal indicative of a strong user comprises:

determining a plurality of channel estimates for the strong user;

performing a frequency transformation on the plurality of channel estimates for the strong user to obtain a channel frequency response per antenna of the base station;

obtaining a frequency domain product, wherein the frequency domain product is a product of a channel frequency response and a result of performing the single segment frequency domain detection on the signal indicative of a strong user and a desired user, wherein the channel frequency response is based, at least, on the plurality of channel estimates for the strong user; and generating the residual signal by subtracting the frequency domain product from the single segment frequency domain detection on the signal indicative of a strong user and a desired user.

24. The computer program product of claim 13, wherein frequency domain detection is multi-segment frequency domain detection comprising:

dividing the signal indicative of a strong user and a desired user on a physical random access channel into multiple segments;

performing frequency domain matching on zero padded versions of the multiple segments;

performing circular correlation via frequency domain multiplication;

estimating channel estimates per segment, and generating a channel frequency response per segment;

obtaining a plurality of frequency domain products, wherein the plurality of frequency domain products are products of channel frequency responses and results of performing the multi-segment frequency domain detection on multiple segments of the signal indicative of a strong user and a desired user, wherein each of the channel frequency responses are based, at least, on a plurality of channel estimates for the strong user; and generating residual signals by subtracting the plurality of frequency domain products from respective multi-segment frequency domain detection on multiple segments of the signal indicative of a strong user and a desired user.

25. An apparatus, comprising:

means for receiving a signal indicative of a strong user and a desired user on a physical random access channel;

means for performing at least one of a single segment frequency domain detection or a multi-segment frequency domain detection on the signal indicative of a strong user and a desired user;

means for generating a residual signal by cancelling out the signal indicative of a strong user; and means for obtaining a message transmitted by a user equipment by performing at least one of the single segment frequency domain detection or multi-segment frequency domain detection on the residual signal.

26. The apparatus of claim 25, wherein the message is a random access message received on the physical random access channel.

27. The apparatus of claim 26, wherein the physical random access channel is received on a set of resources such that the physical random access channel for a first base station interferes with a physical random access channel for a second base station.

28. The apparatus of claim 27, wherein the second base station is an access point.

29. The apparatus of claim 27, wherein the first base station is associated with at least one of a pico cell or a Femto cell, and wherein the second base station is associated with a macro cell.

30. The apparatus of claim 28, wherein a time duration of a physical random access channel for a second base station overlaps with and is a subset of a time duration of a physical random access channel for a first base station.

31. The apparatus of claim 28, further comprising means for receiving one or more parameters related to transmission of the physical random access channel to the access point, and means for selecting resources for receiving the physical random access channel at the first base station based, at least, on one or more parameters related to transmission of the physical random access channel to the access point.

32. The apparatus of claim 31, wherein one or more parameters are received over a backhaul communicatively coupled between the first base station and an access point.

33. The apparatus of claim 31, wherein one or more parameters are determined by receiving, over-the-air, a system information block transmitted from the access point.

34. The apparatus of claim 25, wherein frequency domain detection is single segment frequency domain detection, the apparatus further comprising:

means for performing a cyclic cross-correlation with a local replica of a random access sequence;

means for determining a random access channel signal at a selected antenna of a base station, wherein the base station is configured to perform the determining;

means for performing a segment correlation for a selected root associated with the random access sequence; and means for performing cyclic cross correlation for each root sequence associated with the random access sequence.

35. The apparatus of claim 34, wherein said means for generating a residual signal by cancelling out the signal indicative of a strong user comprises:

means for determining a plurality of channel estimates for the strong user;

means for performing a frequency transformation on the plurality of channel estimates for the strong user to obtain a channel frequency response per antenna of the base station;

means for obtaining a frequency domain product, wherein the frequency domain product is a product of a channel frequency response and a result of performing the single segment frequency domain detection on the signal indicative of a strong user and a desired user, wherein the channel frequency response is based, at least, on the plurality of channel estimates for the strong user; and means for generating the residual signal by subtracting the frequency domain product from the single segment frequency domain detection on the signal indicative of a strong user and a desired user.

36. The apparatus of claim 25, wherein frequency domain detection is multi-segment frequency domain detection, the apparatus further comprising:

means for dividing the signal indicative of a strong user and a desired user on a physical random access channel into multiple segments;

means for performing frequency domain matching on zero padded versions of the multiple segments;

means for performing circular correlation via frequency domain multiplication;

means for estimating channel estimates per segment, and generating a channel frequency response per segment;

means for obtaining a plurality of frequency domain products, wherein the plurality of frequency domain products are products of channel frequency responses and results of performing the multi-segment frequency domain detection on multiple segments of the signal indicative of a strong user and a desired user, wherein each of the channel frequency responses are based, at least, on a plurality of channel estimates for the strong user; and means for generating residual signals by subtracting the plurality of frequency domain products from respective multi-segment frequency domain detection on multiple segments of the signal indicative of a strong user and a desired user.

37. An apparatus, comprising:
a physical random access channel processing module configured to:
receive a signal indicative of a strong user and a desired user on a physical random access channel;
perform at least one of a single segment frequency domain detection or a multi-segment frequency domain detection on the signal indicative of a strong user and a desired user;
generate a residual signal by cancelling out the signal indicative of a strong user; and
obtain a message transmitted by a user equipment by performing at least one of the single segment frequency domain detection or multi-segment frequency domain detection on the residual signal.

38. The apparatus of claim 37, wherein the message is a random access message received on the physical random access channel.

39. The apparatus of claim 38, wherein the physical random access channel is received on a set of resources such that the physical random access channel for a first base station interferes with a physical random access channel for a second base station.

40. The apparatus of claim 39, wherein the second base station is an access point.

41. The apparatus of claim 39, wherein the first base station is associated with at least one of a pico cell or a Femto cell, and wherein the second base station is associated with a macro cell.

42. The apparatus of claim 40, wherein a time duration of a physical random access channel for a second base station overlaps with and is a subset of a time duration of a physical random access channel for a first base station.

43. The apparatus of claim 40, further comprising receiving one or more parameters related to transmission of the physical random access channel to the access point, and selecting resources for receiving the physical random access channel at the first base station based, at least, on the one or more parameters related to transmission of the physical random access channel to the access point.

44. The apparatus of claim 43, wherein the one or more parameters are received over a backhaul communicatively coupled between the first base station and an access point.

45. The apparatus of claim 43, wherein the one or more parameters are determined by receiving, over-the-air, a system information block transmitted from the access point.

46. The apparatus of claim 37, wherein frequency domain detection is single segment frequency domain detection comprising:
performing a cyclic cross-correlation with a local replica of a random access sequence;
determining a random access channel signal at a selected antenna of a base station, wherein the base station is configured to perform the determining;
performing a segment correlation for a selected root associated with the random access sequence; and
performing cyclic cross correlation for each root sequence associated with the random access sequence.

47. The apparatus of claim 46, and wherein the generating a residual signal by cancelling out the signal indicative of a strong user comprises:
determining a plurality of channel estimates for the strong user;
performing a frequency transformation on the plurality of channel estimates for the strong user to obtain a channel frequency response per antenna of the base station;
obtaining a frequency domain product, wherein the frequency domain product is a product of a channel frequency response and a result of performing the single segment frequency domain detection on the signal indicative of a strong user and a desired user, wherein the channel frequency response is based, at least, on the plurality of channel estimates for the strong user; and
generating the residual signal by subtracting the frequency domain product from the single segment frequency domain detection on the signal indicative of a strong user and a desired user.

48. The apparatus of claim 37, wherein frequency domain detection is multi-segment frequency domain detection comprising:
dividing the signal indicative of a strong user and a desired user on a physical random access channel into multiple segments;
performing frequency domain matching on zero padded versions of the multiple segments;
performing circular correlation via frequency domain multiplication;
estimating channel estimates per segment, and generating a channel frequency response per segment;
obtaining a plurality of frequency domain products, wherein the plurality of frequency domain products are products of channel frequency responses and results of performing the multi-segment frequency domain detection on multiple segments of the signal indicative of a strong user and a desired user, wherein each of the channel frequency responses are based, at least, on a plurality of channel estimates for the strong user; and
generating residual signals by subtracting the plurality of frequency domain products from respective multi-segment frequency domain detection on multiple segments of the signal indicative of a strong user and a desired user.

* * * * *